(12) United States Patent
Maas

(10) Patent No.: US 9,644,131 B2
(45) Date of Patent: May 9, 2017

(54) ALTERNATIVE LIGAND FORMULATIONS FOR CELLULOSE PRODUCTS

(75) Inventor: Antonius Franciscus Maas, Baexem (NL)

(73) Assignee: CP Kelco Oy, Aanekoski (FI)

( * ) Notice: Subject to any disclaimer, the term of this patent is extended or adjusted under 35 U.S.C. 154(b) by 357 days.

(21) Appl. No.: 13/486,394

(22) Filed: Jun. 1, 2012

(65) Prior Publication Data

US 2013/0053283 A1 Feb. 28, 2013

Related U.S. Application Data

(60) Provisional application No. 61/528,942, filed on Aug. 30, 2011.

(51) Int. Cl.

| C09K 8/035 | (2006.01) |
|---|---|
| C09K 8/10 | (2006.01) |
| C08B 15/00 | (2006.01) |
| C09K 8/20 | (2006.01) |
| C08L 1/28 | (2006.01) |

(52) U.S. Cl.
CPC .............. C09K 8/10 (2013.01); C08B 15/00 (2013.01); C08L 1/28 (2013.01); C08L 1/286 (2013.01); C09K 8/206 (2013.01)

(58) Field of Classification Search
CPC ........ C09K 8/588; C09K 8/524; C09K 8/582; C09K 8/035; C09K 8/12; C09K 8/46; C09K 8/487; C09K 8/528; C09K 8/54; C09K 8/5751; C09K 8/584; C09K 8/62; C09K 8/685; C09K 8/80; C09K 8/88; C09K 8/467; C09K 2211/1029; C09K 8/428; C09K 9/02; A21D 2/18; A61K 31/167; A61K 31/185; A61K 31/485; A61K 45/06; A61K 9/1617; A61K 9/1623; A61K 9/1694; A61K 9/2013; A61K 9/209

See application file for complete search history.

(56) References Cited

U.S. PATENT DOCUMENTS

| 2,571,093 A | 10/1951 | Temple | |
|---|---|---|---|
| 3,719,503 A | 3/1973 | Podlas | |
| 3,762,476 A * | 10/1973 | Gall | C09K 8/887 166/270 |
| 3,762,485 A * | 10/1973 | Chesser | C09K 8/22 166/305.1 |
| 3,943,078 A | 3/1976 | James | |
| 4,601,340 A * | 7/1986 | Fodor | C09K 8/512 166/294 |
| 4,720,303 A | 1/1988 | Soldatos | |
| 5,089,149 A | 2/1992 | Ridland et al. | |
| 5,143,157 A | 9/1992 | Harms | |
| 5,304,620 A | 4/1994 | Holtmyer et al. | |
| 5,439,057 A | 8/1995 | Weaver et al. | |
| 5,478,802 A | 12/1995 | Moradi-Araghi | |
| 5,981,447 A | 11/1999 | Chang et al. | |
| 6,258,756 B1 | 7/2001 | Hayatdavoudi | |
| 6,303,544 B1 | 10/2001 | Maas et al. | |
| 6,586,587 B1 | 7/2003 | Maas et al. | |
| 6,809,067 B2 | 10/2004 | Von Krosigk | |
| 7,159,658 B2 | 1/2007 | Frost et al. | |
| 7,211,546 B2 | 5/2007 | Dobson, Jr. et al. | |
| 7,531,484 B2 | 5/2009 | Cole et al. | |
| 2007/0187096 A1 | 8/2007 | Pauls et al. | |
| 2008/0020948 A1 | 1/2008 | Rodrigues et al. | |
| 2008/0217011 A1 | 9/2008 | Pauls et al. | |
| 2011/0214859 A1* | 9/2011 | Loveless | C09K 8/10 166/275 |
| 2012/0220503 A1* | 8/2012 | Sanchez Reyes | C09K 8/685 507/213 |

FOREIGN PATENT DOCUMENTS

| DE | 19609194 A1 | | 11/1997 |
|---|---|---|---|
| EP | 0026332 | * | 4/1981 |
| EP | 0026332 A2 | | 4/1981 |
| EP | 1038937 | * | 3/2000 |
| EP | 1038937 A1 | | 9/2000 |
| EP | 1188772 | * | 8/2001 |
| EP | 1188772 B1 | | 3/2011 |
| WO | 2008107674 A1 | | 9/2008 |
| WO | 2011/107759 A1 | | 9/2011 |

OTHER PUBLICATIONS

PCT International Search Report and Written Opinion for PCT/EP2012/063914 mailed Oct. 11, 2012.
OSPAR Convention for the Protection of the Marine Environment of the North-East Atlantic, OSPAR List of Substances/Preparations Used and Discharged Offshore which Are Considered to Pose Little or No Risk to the Environment (PLONOR), OSPAR Commission, Reference No. 2004-10E, 2008 Update.

* cited by examiner

*Primary Examiner* — Kumar R Bhushan
(74) *Attorney, Agent, or Firm* — Eversheds Sutherland (US) LLP

(57) ABSTRACT

This disclosure provides compositions suitable as drilling fluids, completion fluids, work-over fluids, or stimulation/fracking fluids, which exhibit shale inhibiting, thermostabilizing, viscosifying, and fluid loss reducing effects when used for these purposes. In some embodiments, this disclosure provides compositions that include a cellulose product comprising the contact product of: at least one cellulosic ether; at least one salt of a polyvalent metal ion; and at least one ligand or a salt of the ligand. The resulting cellulose products are useful in drilling of oil, gas, and other wells.

16 Claims, No Drawings

ALTERNATIVE LIGAND FORMULATIONS FOR CELLULOSE PRODUCTS

CROSS REFERENCE TO RELATED APPLICATIONS

This application claims the benefit of U.S. Provisional Application No. 61/528,942 filed Aug. 30, 2011, the disclosure of which is incorporated herein by reference in its entirety.

TECHNICAL FIELD OF THE DISCLOSURE

This disclosure relates to compositions that provide shale inhibiting, thermostabilizing, viscosifying, and/or fluid loss reducing effects when used as drilling fluids, completion fluids, work-over fluids, or stimulation/fracking fluids.

BACKGROUND

The conventional practice when drilling oil and gas wells is to use a drilling fluid or "mud" to provide certain engineering functions and to enhance the efficiency of the drilling operation. Typically, a drilling fluid is continuously circulated from a storage area on the surface, down through the drill pipe, and then returned through the borehole to the surface. One function of the drilling fluid is to act as a carrier to remove drilled solids, such as cuttings and formation carvings, from the borehole to the surface. The transfer of cuttings to the surface is effective because the fluids posses a certain rheology to suspend and carry the solids, and various viscosifying components are usually included in the drilling fluid for this purpose.

The fluid can also function to cool and lubricate the drill bit, to prevent pressure from being lost if a void or gas pocket is encountered, and to reduce the introduction of fluids, salts, and solids into the geological formation encountered in the operation. This latter function becomes extremely important when drilling through formations of clay or shale. Shales are composed of primary clay minerals, which may be altered when contacted with water. For example, the smectites are notorious for their considerable swelling and expansion when contacted with water, due to water penetrating the interlayer spaces of the clay. As a result, when clay and shale are encountered in a drilling operation, their contact with water can induce swelling, which may cause deformation of the wellbore wall, reduced well diameter, and binding of the drill pipe or bit in the formation. Brittle fractures of the formation also can develop, and the fractured clay chips will precipitate to the bottom of the well adjacent the drill bit, possibly blocking its retrieval and movement of the drillstring. Therefore, one of the most desirable functions of a drilling fluid is to limit or minimize the effects of water on shales and clays that are encountered in a drilling operation.

As a result, there is a continuing need for new drilling fluid compositions and methods that are effective in reducing or minimizing the fracturing, swelling, or dispersion of shales and clays when the fluid contacts these formations. It would be desirable if effective drilling fluid compositions could be developed that are more environmentally benign than those currently in use, to meet more stringent industrial standards. This environmental goal has assumed a new sense of urgency as, for example, regulatory pressures such as the European Union's (EU's) REACH (Registration, Evaluation, Authorization and Restriction of Chemicals, 2006) Regulations seek to improve protection of human health and the environment from chemical risks. It would also be desirable if new completion fluids, work-over fluids, and stimulation/fracking fluids could be developed that are similarly environmentally sound.

SUMMARY OF THE INVENTION

This disclosure provides for new water-based compositions suitable for use in drilling fluids, completion fluids, work-over fluids, or stimulation/fracking fluids, which exhibit shale inhibiting, thermostabilizing, viscosifying, and/or fluid loss reducing effects when used for these purposes. In one aspect, the new water-based compositions can comprise cellulose products. For example a cellulose product according to this disclosure can comprise the contact product of a cellulosic ether, a polyvalent metal salt, and a ligand or a salt of the ligand, in which the ligand can be selected from a tertiary-nitrogen-free poly(carboxylic) acid ligand or a salt thereof. In some aspects and embodiments, the ligand can be selected from particular tertiary-nitrogen containing poly(carboxylic) acid ligands or a salt thereof. For example, in an aspect, the ligand can be selected from particular tertiary-nitrogen containing poly(carboxylic) acid ligands or a salt thereof, for example, L-glutamic acid N,N-diacetic acid, methylglycinediacetic acid, 2-hydroxyethyliminodiacetic acid, salts, or combinations thereof. In various embodiments, the polyvalent metal salt can be selected from an alkaline earth metal salt, a first row transition metal salt, a group 13 metal salt, or a group 14 metal salt.

Generally, the ligand is selected such that, in combination with the metal salt, it may participate in connecting the cellulosic ether to form a cellulose product suitable for use in drilling fluids. The present disclosure further provides a method of making a cellulose product comprising contacting the cellulosic ether with a metal salt and a ligand in a solvent medium, under conditions sufficient to form a cellulose product. A method of using the cellulose product in an aqueous mixture as a drilling fluid, a completion fluid, a work-over fluid, or a stimulation/fracking fluid is also disclosed.

In various aspects and embodiments, there is provided a cellulose product comprising, or comprising the contact product of:
a) at least one cellulosic ether;
b) at least one salt of a polyvalent metal ion; and
c) at least one ligand selected from: a poly(carboxylic) acid that comprises secondary nitrogen atoms, primary nitrogen atoms, or no nitrogen atoms, referred to herein as a tertiary-nitrogen-free poly(carboxylic) acid.

In some aspects and embodiments, this disclosure provides a cellulose product comprising, or comprising the contact product of:
a) at least one cellulosic ether;
b) at least one salt of a polyvalent metal ion; and
c) at least one ligand selected from citric acid, malic acid, maleic acid, fumaric acid, oxaloacetic acid, aconitic acid, iso-citric acid, α-ketoglutaric acid, β-ketoglutaric acid, succinic acid, ascorbic acid, 2,2'-azanediyldisuccinic acid, tetrasodium iminodisuccinate, dicarboxymethyl glutamic acid, ethylenediamine-N,N'-disuccinic acid, oxalic acid, aspartic acid, glutaric acid, glutamic acid, salts thereof, and combinations thereof.

Alternatively, the least one ligand can be selected from citric acid, malic acid, maleic acid, fumaric acid, oxaloacetic acid, aconitic acid, iso-citric acid, α-ketoglutaric acid, β-ketoglutaric acid, succinic acid, ascorbic acid, 2,2'-azanediyldisuccinic acid, tetrasodium iminodisuccinate, dicarboxymethyl glutamic acid, ethylenediamine-N,N'-disuccinic acid, oxalic acid, aspartic acid, glutaric acid, glutamic acid, L-glutamic acid N,N-diacetic acid, methylglycinediacetic acid, 2-hydroxyethyliminodiacetic acid, salts thereof, any combinations thereof, and any of these ligands or their salts individually.

The present aqueous compositions exhibit shale and clay inhibition properties, but also provide improved performance as illustrated by filtrate reduction, better temperature stability, and enhanced viscosity, all of which are useful drilling fluid parameters.

Cellulose products exist in which nitrilo-tri-acetic acid (NTA) has been used as a chelating ligand, along with various metal salts, for producing modified a cellulose product. The use of NTA in such applications will be disallowed because of its carcinogenic and environmental risks. Therefore, the present disclosure provides new cellulose products that can be used to prepare drilling fluid compositions that are environmentally sound than those using NTA.

These and other aspects and embodiments of the disclosed compositions and methods are described more fully in the detailed description. Patents and publications that may be of interest to various aspects of the present disclosure include: EP 1038937; U.S. Pat. No. 6,303,544; and EP 1188772.

DETAILED DESCRIPTION OF THE INVENTION

This disclosure provides compositions suitable as drilling fluids, completion fluids, work-over fluids, or stimulation/fracking fluids, which exhibit shale inhibiting, thermostabilizing, viscosifying, and/or fluid loss reducing effects when used for these purposes. In one embodiment, there is provided a cellulose product, including a cellulose product which can have less than 10 wt % water if desired, comprising, or comprising the contact product of:
  a) a cellulosic ether selected from carboxymethyl cellulose (CMC), hydroxyethyl cellulose (HEC), carboxymethyl hydroxyethyl cellulose (CMHEC), methyl cellulose (MC), hydroxyethyl methyl cellulose (HEMC), ethyl hydroxyl ethyl cellulose (EHEC), hydroxypropyl cellulose (HPC), and combinations thereof;
  b) a salt of a polyvalent metal ion of beryllium, magnesium, calcium, strontium, barium, titanium, vanadium, chromium, manganese, iron, cobalt, nickel, zinc, aluminum, tin, or combinations thereof; and
  c) at least one ligand selected from at least one poly (carboxylic) acid or a salt thereof that comprises secondary nitrogen atoms, primary nitrogen atoms, or no nitrogen atoms.

By disclosure of either a poly(carboxylic) acid or a salt of the poly(carboxylic) acid, it is intended to disclose both the acid form and the salt form. Examples of the poly(carboxylic) acids or salts thereof from which the ligand can be selected include, but are not limited to, citric acid, malic acid, maleic acid, fumaric acid, oxaloacetic acid, aconitic acid, iso-citric acid, α-ketoglutaric acid, β-ketoglutaric acid, succinic acid, ascorbic acid, 2,2'-azanediyldisuccinic acid, tetrasodium iminodisuccinate, dicarboxymethyl glutamic acid, ethylenediamine-N,N'-disuccinic acid, oxalic acid, aspartic acid, glutaric acid, glutamic acid, salts thereof, and combinations thereof. In a further aspect, the poly(carboxylic) acids or salts thereof from which the ligand can be selected include, but are not limited to, L-glutamic acid N,N-diacetic acid, methylglycinediacetic acid, 2-hydroxyethyliminodiacetic acid, salts thereof, and combinations thereof.

By way of example, the cellulose product of this disclosure can comprise a cellulosic ether, a polyvalent metal ion, and a ligand selected from a citric acid cycle substrate or product. The cellulose product can contain less than 10 wt % water if desired or alternatively, can contain less than 8 wt % water if desired. In embodiments, this disclosure provides a cellulose product that comprises the components a) through c) recited above, or in various alternatives, consists essentially of, comprises the contact product of, comprises the reaction product of, or consists essentially of the contact product or the reaction product of components a) through c) recited above.

In other embodiments, there is provided a cellulose product, including a cellulose product which can have less than 10 wt % water if desired, comprising, or comprising the contact product of:
  a) a cellulosic ether selected from carboxymethyl cellulose (CMC), hydroxyethyl cellulose (HEC), carboxymethyl hydroxyethyl cellulose (CMHEC), methyl cellulose (MC), hydroxyethyl methyl cellulose (HEMC), ethyl hydroxyl ethyl cellulose (EHEC), hydroxypropyl cellulose (HPC), and combinations thereof;
  b) a salt of a polyvalent metal ion of magnesium, calcium, strontium, barium, titanium, chromium, manganese, iron, cobalt, nickel, zinc, aluminum, tin, or combinations thereof; and
  c) at least one ligand selected from at least one poly (carboxylic) acid or a salt thereof that comprises secondary nitrogen atoms, primary nitrogen atoms, or no nitrogen atoms, for example, citric acid, malic acid, maleic acid, fumaric acid, oxaloacetic acid, aconitic acid, iso-citric acid, α-ketoglutaric acid, β-ketoglutaric acid, succinic acid, ascorbic acid, 2,2'-azanediyldisuccinic acid, tetrasodium iminodisuccinate, ethylenediamine-N,N'-disuccinic acid, aspartic acid, glutaric acid, glutamic acid, L-glutamic acid N,N-diacetic acid, methylglycinediacetic acid, 2-hydroxyethyliminodiacetic acid, salts thereof, and combinations thereof.

According to certain embodiments, the cellulosic ether can be carboxymethyl cellulose (CMC). Alternatively, the cellulosic ether can be hydroxyethyl cellulose (HEC); alternatively, carboxymethyl hydroxyethyl cellulose (CMHEC); alternatively, methyl cellulose (MC); alternatively, hydroxyethyl methyl cellulose (HEMC); alternatively, ethyl hydroxyl ethyl cellulose (EHEC); alternatively, hydroxypropyl cellulose (HPC); or alternatively, any combination thereof.

Generally, a ligand is selected that, in combination with the metal salt and the cellulosic ether, can form a cellulose product suitable for use in drilling fluids. The metal salt can be a salt of a polyvalent metal ion. In various embodiments, the polyvalent metal salt can be selected from an alkaline earth metal salt, a first row transition metal salt, a group 13 metal salt, or a group 14 metal salt.

According to certain embodiments, the cellulose product can be prepared using a salt of a polyvalent metal ion selected from beryllium, magnesium, calcium, strontium, barium, titanium, vanadium, chromium, manganese, iron, cobalt, nickel, zinc, aluminum, tin, or combinations thereof. In some aspects, the polyvalent metal ion can be selected from calcium, aluminum, iron, zinc, nickel, tin, or combinations thereof. The salt of a polyvalent metal ion can be a water soluble salt, for example, a water soluble salt or compound of beryllium(II), magnesium(II), calcium(II), strontium(II), barium(II), titanium(II), vanadium(II), vanadium(IV), vanadium(V), chromium(III), chromium(IV), manganese(II), manganese(III), iron(II), iron(III), cobalt(II), cobalt(III), nickel(II), zinc(II), aluminum(III), tin(II), tin (IV), or combinations thereof. For example, the salt of a polyvalent metal ion can be a salt or compound of beryllium (II); alternatively, magnesium(II); alternatively, calcium(II); alternatively, strontium(II); alternatively, barium(II); alternatively, titanium(II); alternatively, vanadium(II); alternatively, vanadium(IV; alternatively, vanadium(V; alternatively, chromium(III); alternatively, chromium(IV); alternatively, manganese(II; alternatively, manganese(III); alternatively, iron(II); alternatively, iron(III); alternatively, cobalt(II); alternatively, cobalt(III); alternatively, nickel(II); alternatively, zinc(II); alternatively, aluminum(III); alternatively, tin(II); alternatively, tin (IV); or alternatively, combinations thereof. Water soluble salts of aluminum(III) such as aluminum(III) sulfate and calcium(II) salts such as calcium(II) chloride or calcium(II) hydroxide are particularly useful.

In a further embodiment or aspect, suitable salts or compounds can comprise a polyvalent metal ion that has a standard reduction potential $E^0$ (V) of greater than or equal to −2.9 V. In further embodiments, the polyvalent metal ion can have a standard reduction potential $E^0$ (V) of greater than −2.4 V; alternatively, greater than −1.7 V; alternatively, greater than −1.2 V; or alternatively, greater than −0.8 V. For these embodiments, an upper limit standard reduction potential can be about +0.8 V, and values between these lower and upper values are encompassed. Further, the polyvalent metal ion can be selected from an alkaline earth metal, a first row transition metal, a second row transition metal, and a main group metal. For example, the polyvalent metal ion can be an alkaline earth metal; alternatively, a first row transition metal, alternatively, a second row transition metal; or alternatively a main group metal. Typically, the salts are water soluble. In certain embodiments, the polyvalent metal ion can be provided as a chloride, a nitrate, a sulfate, a sulfite, a phosphate, or an organic-linked agent. Thus, the term "salt of a polyvalent metal ion" can include organometallic agents, as well as conventional salts.

One aspect of this disclosure is the replacement of ligands that are carcinogenic or environmentally disfavored, with ligands without these properties. According to certain embodiments, suitable ligands or chelators that can be used to provide the cellulose product can be selected from a tertiary-nitrogen-free poly(carboxylic) acid. That is, the ligand can be a poly(carboxylic) acid that comprises secondary nitrogen atoms, primary nitrogen atoms, or no nitrogen atoms. Examples of such ligands include, but are not limited to, the poly(carboxylic) acid substrates and products that are involved in the citric acid cycle. For example, the poly(carboxylic) acid can be citric acid, malic acid, maleic acid, fumaric acid, oxaloacetic acid, aconitic acid, iso-citric acid, α-ketoglutaric acid, β-ketoglutaric acid, succinic acid, ascorbic acid, 2,2'-azanediyldisuccinic acid, tetrasodium iminodisuccinate, dicarboxymethyl glutamic acid, ethylenediamine-N,N'-disuccinic acid, oxalic acid, aspartic acid, glutaric acid, glutamic acid, and the like, including and combinations thereof. Suitable ligands also can be at least two carboxyl or carboxylate groups, for example, two, three, four, or five carboxyl or carboxylate groups. Any salts such as water-soluble salts of these acids are also suitable for use as ligands or chelators, and salts including water-soluble salts of any acid recited in this disclosure can also be used to prepare the cellulose product.

In various embodiments, other poly(carboxylic) acid ligands that comprise secondary nitrogen atoms, primary nitrogen atoms, or no nitrogen atoms that can be used to prepare the modified cellulose product include, but are not limited to, 2,2'-azanediyldisuccinic acid, tetrasodium iminodisuccinate, dicarboxymethyl glutamic acid, ethylenediamine-N,N'-disuccinic acid (EDDS), oxalic acid, aspartic acid, glutaric acid, glutamic acid, and the like. Some of these tertiary-nitrogen-free poly(carboxylic) acid also can be described as α-amino acids, and α-amino acids and salts thereof also constitute a useful type of ligand that can be used to prepare the cellulose product. For example, aspartic acid and glutamic acid are useful in the compositions and methods of this disclosure, and they may be described both as tertiary-nitrogen-free poly(carboxylic) acids and as the α-amino acids. Other examples of α-amino acids that can be used include, but are not limited to, asparagines, arginine, aspartic acid, methionine, glutamic acid, glutamine, lysine, ornithine, or combinations thereof.

According to certain embodiments, suitable ligands or chelators that can be used to provide the cellulose product can be selected from a tertiary-nitrogen containing poly(carboxylic) acid other than nitrilo-tri-acetic acid (NTA) or a salt thereof. That is, the ligand can be a poly(carboxylic) acid that comprises one or more tertiary nitrogen atoms, but is not a poly(carboxylic) acid of the formula $N(CH_2CO_2H)_3$. These poly(carboxylic) acid ligands comprising at least one tertiary nitrogen atom can be, but are not limited to: L-glutamic acid N,N-diacetic acid and/or salts thereof, such as the tetra sodium salt; methylglycinediacetic acid (MGDA) and/or salts thereof, such as the trisodium salt; and 2-hydroxyethyliminodiacetic acid and/or salts thereof, such as the disodium salt. According to another aspect, the tertiary-nitrogen containing poly(carboxylic) acid other than nitrilo-tri-acetic acid (NTA) can have the formula $N(CH_2CO_2H)_2(XCO_2H)$ or $N(CH_2CO_2H)_2[Y(CO_2H)_2]$, wherein X and Y is a $C_2$ to $C_8$ hydrocarbyl group, for example, an alkylene group, which can be linear or branched as permitted by the number of carbon atoms.

According to other embodiments, suitable ligands or chelators can be selected from particular tertiary-nitrogen containing poly(carboxylic) acids or their salts. For example, while not intending to be limited by particular embodiments or theory, in an aspect the ligand can be selected from a tertiary-nitrogen containing poly(carboxylic) acid ligands or a salt thereof, with the proviso the ligand generally is not selected from nitrilo-tri-acetic acid (NTA); 1,2-cyclo-hexan-diamin-N,N,N',N'-tetraacetic acid; diethylene triamine pentaacetic acid; ethylene-di-oxy-bis (ethylene-nitrilo)tetraacetic acid; (N-(2-hydroxyethyl) ethylene-diamino-N, N',N',tri-acetic acid; triethylene tetraamine hexaacetic acid; and N-(hydroxyethyl) ethylene diamine triacetic acid; or is not any of these ligands individually.

In some embodiments, the composition can be devoid of acrylic or acrylate polymers and devoid of synthetic latex materials. The compositions can also be devoid of combinations that include these acrylic or acrylate polymers and synthetic latex materials with acids from the citric acid cycle, such as citric acid and malic acid. As disclosed, the citric acid cycle acids and the other ligands in the absence of synthetic latex materials and acrylic polymers are useful.

According to some embodiments, particularly useful ligands or chelators that can be employed according to this disclosure include, but are not limited to, citric acid, malic acid, maleic acid, fumaric acid, oxaloacetic acid, aconitic acid, iso-citric acid, α-ketoglutaric acid, β-ketoglutaric acid, succinic acid, ascorbic acid, and any combination thereof. In some embodiments, the ligand can be citric acid; alternatively, malic acid; alternatively, maleic acid; alternatively, fumaric acid; alternatively, oxaloacetic acid; alternatively, aconitic acid; alternatively, iso-citric acid; alternatively, α-ketoglutaric acid; alternatively, β-ketoglutaric acid; alternatively, succinic acid; alternatively, ascorbic acid; or alternatively, any combination thereof.

While any number of ligands and chelator types can be employed in the cellulose product, chelator selection may be based on the lack of carcinogenic properties, in which known or even suspected carcinogens are avoided. According to certain embodiments, chelator selection may be based upon increasing or optimizing the environmental safety of the selected compound. This latter criterion is expected to become increasingly important, as new environmental regulations such as REACH, OSPAR (the Convention for the Protection of the Marine Environment of the North-East Atlantic) or GHS (Globally Harmonized System of Classification and Labeling of Chemicals) may create obstacles for using existing compounds, despite their excellent performance. In particular, reference is made to the substances on the PLONOR (Pose Little Or No Risk to the environment) list from the OSPAR List of Substances. For example, substances that appear in the PLONOR list include cellulosic ethers such as hydroxyethyl cellulose (HEC) and carboxymethyl hydroxyethyl cellulose (CMHEC). Ligands that appear in the PLONOR list include citric acid and its monohydroate. Salt of a polyvalent metal ion that appear in the PLONOR list include aluminum(III) sulfate, calcium(II) chloride, and calcium(II) chloride dihydrate, all of which can be used alone or in combinations according to this disclosure.

Of the components used to prepare the cellulose product, certain combinations and methods have been particularly useful. According to embodiments, useful combinations include those in which the cellulosic ether is carboxymethyl cellulose (CMC), hydroxyethyl cellulose (HEC), carboxymethyl hydroxyethyl cellulose (CMHEC), methyl cellulose (MC), hydroxyethyl methyl cellulose (HEMC), ethyl hydroxyl ethyl cellulose (EHEC), or hydroxypropyl cellulose (HPC); the polyvalent metal ion is calcium (II), aluminum(III), iron(II), iron(III), zinc(II), nickel(II), tin(II), or tin (IV); and the ligand is a citric acid cycle substrate or product. Typically, the isolated and cellulose product has been dried to less than 10 wt % water. Other useful combinations include those in which the cellulosic ether is carboxymethyl cellulose (CMC); the polyvalent metal ion is calcium (II) or aluminum(III); the ligand is citric acid, malic acid, or maleic acid; and the cellulose product has less than 10 wt % water. In various embodiments, a useful source of the polyvalent metal ion is aluminum sulfate, that this salt has been used in combination with carboxymethyl cellulose (CMC) and a ligand selected from citric acid, malic acid, maleic acid, and combinations thereof. In other embodiments, a useful source of the polyvalent metal ion is calcium chloride, that this salt has been used in combination with carboxymethyl cellulose (CMC) and a ligand selected from citric acid, malic acid, maleic acid, and combinations thereof.

As indicated, the cellulose product can be dried to have less than 10% by weight water. The cellulose product also can be dried to have less than 15% by weight, less than 14% by weight, less than 13% by weight, less than 12% by weight, less than 11% by weight, less than 10% by weight, less than 9% by weight, less than 8% by weight, less than 7% by weight, less than 6% by weight, or less than 5% by weight water. The water content is usually stated as less than 10% by weight water, which works well, but water content of less than 9% by weight and less than 8% by weight are also commonly provided.

By way of example, one aspect of this disclosure provides a cellulose product comprising or a cellulose product comprising the contact product of:
 a) at least one cellulosic ether;
 b) at least one salt of a polyvalent metal ion; and
 c) at least one ligand selected from citric acid, malic acid, maleic acid, fumaric acid, oxaloacetic acid, aconitic acid, iso-citric acid, α-ketoglutaric acid, β-ketoglutaric acid, succinic acid, ascorbic acid, 2,2'-azanediyldisuccinic acid, tetrasodium iminodisuccinate, dicarboxymethyl glutamic acid, ethylenediamine-N,N'-disuccinic acid, oxalic acid, aspartic acid, glutaric acid, glutamic acid, salts thereof, and combinations thereof.

In accordance with this aspect, examples of various embodiments include one in which the cellulosic ether is carboxymethyl cellulose (CMC); the polyvalent metal ion is calcium (II), aluminum(III), iron(II), iron(III), zinc(II), nickel(II), tin(II), or tin (IV); the ligand is a citric acid cycle substrate or product; and the cellulose product has less than 10 wt % water.

Embodiments of this disclosure provide a cellulose product comprising or a cellulose product comprising the contact product of: carboxymethyl cellulose (CMC); calcium(II) or aluminum(III); citric acid, malic acid, or maleic acid; and wherein the cellulose product has less than 10 wt % water. Embodiments of this disclosure also provide a cellulose product comprising or a cellulose product comprising the contact product of: carboxymethyl cellulose (CMC); calcium(II) or aluminum(III); citric acid or malic acid; and wherein the cellulose product has less than 8 wt % water.

In other embodiments, there is provided a technical grade cellulose product comprising or a technical grade cellulose product comprising the contact product of: a cellulosic ether such as carboxymethyl cellulose (CMC); a polyvalent metal ion such as calcium(II); at least one ligand selected from citric acid, malic acid, maleic acid, fumaric acid, oxaloacetic acid, aconitic acid, iso-citric acid, α-ketoglutaric acid, β-ketoglutaric acid, succinic acid, and ascorbic acid, salts thereof, and combinations thereof; wherein the Plastic Viscosity of a 4 ppb concentration drilling fluid comprising the cellulose product after hot rolling according to API RP13 B-1/ISO 14014-1 is greater than or equal to 10 centiPoise. In these embodiments, the Filtrate Loss (according to API RP13 B-1/ISO 14014-1) of a 4 ppb concentration drilling fluid comprising the cellulose product after hot rolling (according to API RP13 B-1/ISO 14014-1) is less than 15 mL/30 minutes.

Similarly, in other embodiments, there is provided a technical grade cellulose product comprising or a technical grade cellulose product comprising the contact product of: a cellulosic ether such as carboxymethyl cellulose (CMC); a polyvalent metal ion such as aluminum(III); at least one ligand selected from citric acid, malic acid, maleic acid, fumaric acid, oxaloacetic acid, aconitic acid, iso-citric acid, α-ketoglutaric acid, β-ketoglutaric acid, succinic acid, and ascorbic acid, salts thereof, and combinations thereof; wherein the Plastic Viscosity of a 2 ppb concentration drilling fluid comprising the cellulose product after hot rolling according to API RP13 B-1/ISO 14014-1 is greater than or equal to 5 centiPoise. In these embodiments, the Filtrate Loss (according to API RP13 B-1/ISO 14014-1) of a 2 ppb concentration drilling fluid comprising the cellulose product after hot rolling (according to API RP13 B-1/ISO 14014-1) is less than 18 mL/30 minutes.

Still other embodiments provided a purified grade cellulose product comprising or a purified grade cellulose product comprising the contact product of: a cellulosic ether such as carboxymethyl cellulose (CMC); a polyvalent metal ion such as calcium (II); at least one ligand selected from citric acid, malic acid, maleic acid, fumaric acid, oxaloacetic acid, aconitic acid, iso-citric acid, α-ketoglutaric acid, β-ketoglutaric acid, succinic acid, and ascorbic acid, salts thereof, and combinations thereof; wherein the Plastic Viscosity of a 2 ppb concentration drilling fluid comprising the cellulose product after hot rolling according to API RP13 B-1/ISO 14014-1 is greater than or equal to 15 centiPoise. In these embodiments, the Filtrate Loss (according to API RP13 B-1/ISO 14014-1) of a 2 ppb concentration drilling fluid comprising the cellulose product after hot rolling (according to API RP13 B-1/ISO 14014-1) is less than 13 mL/30 minutes.

Yet other embodiments provided a purified grade cellulose product comprising or a purified grade cellulose product comprising the contact product of: a cellulosic ether such as carboxymethyl cellulose (CMC); a polyvalent metal ion such as aluminum(III); at least one ligand selected from citric acid, malic acid, maleic acid, fumaric acid, oxaloacetic acid, aconitic acid, iso-citric acid, α-ketoglutaric acid, β-ketoglutaric acid, succinic acid, and ascorbic acid, salts thereof, and combinations thereof; wherein the Plastic Viscosity of a 1 ppb concentration drilling fluid comprising the cellulose product after hot rolling according to API RP13 B-1/ISO 14014-1 is greater than or equal to 10 centiPoise. In these embodiments, the Filtrate Loss (according to API RP13 B-1/ISO 14014-1) of a 1 ppb concentration drilling fluid comprising the cellulose product after hot rolling (according to API RP13 B-1/ISO 14014-1) is less than 18 mL/30 minutes.

In a further aspect, there is provided a method of making a cellulose product, the method comprising:
a) providing at least one cellulosic ether;
b) in a solvent medium, contacting the cellulosic ether with at least one salt of a polyvalent metal ion and a ligand or a salt of the ligand under conditions sufficient to form a cellulose product;
wherein the ligand is: a poly(carboxylic) acid that comprises secondary nitrogen atoms, primary nitrogen atoms, or no nitrogen atoms, referred to herein as a tertiary-nitrogen-free poly(carboxylic) acid. Alternatively, the ligand can be a tertiary-nitrogen containing poly(carboxylic) acid other than nitrilo-tri-acetic acid (NTA), 1,2-cyclo-hexan-diamin-N,N,N',N'-tetraacetic acid, diethylene triamine pentaacetic acid, ethylene-dioxy-bis(ethylene-nitrilo)tetraacetic acid, (N-(2-hydroxyethyl) ethylene-diamino-N,N',N',tri-acetic acid, triethylene tetraamine hexaacetic acid, and N-(hydroxyethyl) ethylene diamine triacetic acid.

Particularly useful ligands in the method of making a cellulose product include, but are not limited to, citric acid, malic acid, maleic acid, fumaric acid, oxaloacetic acid, aconitic acid, iso-citric acid, α-ketoglutaric acid, β-ketoglutaric acid, succinic acid, ascorbic acid, salts thereof, and combinations thereof.

In a further aspect, there is provided a method of making a cellulose product, the method comprising:
a) providing a cellulosic ether selected from carboxymethyl cellulose (CMC), hydroxyethyl cellulose (HEC), carboxymethyl hydroxyethyl cellulose (CMHEC), methyl cellulose (MC), hydroxyethyl methyl cellulose (HEMC), ethyl hydroxyl ethyl cellulose (EHEC), hydroxypropyl cellulose (HPC), and combinations thereof;
b) in a solvent medium, contacting the cellulosic ether with a salt of a polyvalent metal ion and a ligand or a salt of the ligand under conditions sufficient to form a cellulose product;
wherein the polyvalent metal ion is calcium, aluminum, iron, zinc, nickel, tin, or combinations thereof; and the ligand is citric acid, malic acid, maleic acid, fumaric acid, oxaloacetic acid, aconitic acid, iso-citric acid, α-ketoglutaric acid, β-ketoglutaric acid, succinic acid, ascorbic acid, or combinations thereof; and
c) neutralizing the solvent medium containing the cellulose product.

If desired, in some embodiments, this method can further include the step of: d) isolating the cellulose product. Also if so desired, this method can further include the steps of: d) isolating the cellulose product; and e) drying the isolated cellulose product. Moreover, this step of contacting the cellulosic ether, the salt of a polyvalent metal ion, and a ligand or a salt of the ligand occurs in any order. While the solvent medium is an aqueous medium, it can further include other components and solvents. For example, the solvent medium can comprises water, an alcohol such as ethanol or propanol, or combinations thereof. Also in this method, the cellulosic ether used can be derived from wood pulp, cotton, hemp, or bacterial cellulose, or combinations, with wood pulp being commonly used.

In accordance with another embodiment of the method of making a cellulose product, the salt of a polyvalent metal ion, the ligand, or both can be provided in 0.1-20 wt %, based on the weight of the cellulosic ether. That is, using the weight of the cellulosic ether as a reference weight, the weight of salt of a polyvalent metal ion, the ligand, or both can be 0.1-20 wt % of this reference weight. The weights of the polyvalent metal ion and the ligand are independent of each other. In addition, the salt of a polyvalent metal ion, the ligand, or both can be provided in 0.2-15 wt %, 0.3-10 wt %, or 0.5-5 wt % based on the weight of the cellulosic ether, where the weights of the weights of the polyvalent metal ion and the ligand are independent of each other.

Other embodiments of the method of making a cellulose product include the conditions such as time of reaction and temperature that are used when the components are contacted. Because the selected ligand, in combination with the metal salt and the cellulosic ether, can form a composition suitable for use in drilling fluids, the conditions such as time and temperature can be adjusted to obtain the desired composition properties. In various embodiments, the combination conditions can comprise a temperature of at least 30° C., at least 40° C., at least 50° C., at least 60° C., at least 70° C., at least 80° C., or at least 90° C. While not critical, the upper limit of the temperature is typically considered to the reflux temperature of the particular solvent, which will very according to its composition. When using water, around 100° C. is the upper limit under standard conditions; therefore the temperature can be from about 30° C. to about 100° C. The contact time for the combination also can be adjusted to obtain the desired composition properties, and a contact time of at least 10 minutes, at least 20 minutes, at least 30 minutes, at least 40 minutes, at least 50 minutes, at least 60 minutes, at least 70 minutes, at least 80 minutes, at least 90 minutes, at least 100 minutes, at least 110 minutes, or at least 120 minutes can be used. The upper limit of the contact time is not critical, and it can be based on obtaining the desired properties of the composition such as viscosity, as well as the necessary convenience and efficiency, with longer contact times typically being used for lower temperatures. Therefore, contact times are usually from 10 minutes to 180 minutes.

This disclosure also provides a method of using a cellulose product comprising:
a) providing a cellulose product according to this disclosure;
b) combining the cellulose product with an aqueous carrier to form a water-based modified cellulose composition; and
c) using the water-based modified cellulose composition as a drilling fluid, a completion fluid, a work-over fluid, or a stimulation/fracking fluid.

When using these compositions for drilling, completion, work-over, or stimulation/fracking fluids, the compositions can be combined with further specific ingredients if desired, to tailor the particular fluid to a particular use. In certain embodiments, the water-based modified cellulose composition can be further combined with a cross-linking agent, an inhibition agent, a viscosifying agent, a filtrate reducing agent, a thermal stabilizing agent, a shear strength stabilizing agent, a bentonite clay, an illite clay, a smectite clay, a montmorillonite clay, a kaolite clay, barium sulfate, calcium carbonate, hematite, a starch, a deflocculant, an anionic polyelectrolyte, an acrylate, a polyphosphate, a lignosulfonate, tannic acid, a derivatized tannic acid, an unmodified cellulosic material, a lubricant, a weighting agent, a fluid loss additive, a brine, a formate salt, or combinations thereof, as will be appreciated by one of ordinary skill.

The general manufacture of cellulose ethers is well-established. Typically, cellulose ethers are prepared by combining wood-based or cotton wool-based raw material with a reaction medium, such as alcohol or acetone, and by mercerizing it with an alkali substance such as sodium hydroxide, to activate the cellulose. An etherifying chemical such as monochloracetic acid (MCA) or its Na-salt (NaMCA) can then be added and allowed to react. The end product can be neutralized or its pH adjusted to the desired range. By-products, such as salts generated in the reaction, generally are washed out with alcohol, for example, when purified cellulose ether is manufactured. This purified cellulose is contrasted to the technical grade or crude cellulose ether product in which the by-products such as salts generated in its preparation are left in the product or only partially removed. The solvent used can be separated and the product dried.

Once the technical or purified is prepared, the particle size and the bulk density can be adjusted by grinding the product into powder or by granulating it. The product can also be screened to desired particle size. In this disclosure, the polyvalent metal ion and ligand or salt of the ligand can be added to the cellulose ether at any point of the production before the drying of the product, but preferably are added early in the reaction process, for example, after the etherifying chemical such as monochloracetic acid or its sodium salt are added. For a purified product these components can be applied after the washing step if desired.

The products of this disclosure can be used as drilling fluids, completion fluids, work-over fluids, stimulation/fracking fluids, and the like in technical or in purified form. If purified materials are desired, the resulting polymer products can be cleaned of their reaction by-products such as the sodium chloride and the glycolates that arise from the carboxy-methylating portion of the reaction, which can be washed from the product. This additional purification step is not required, however, because the non-purified technical grade ("tech" grade) materials are also useful and in some cases, it can be beneficial to maintain the reaction ingredients except the liquid elements. The performance of various purified versus technical grade cellulose products are illustrated in the Examples and the data provided herein.

Generally, conventional cellulose products exhibit a wide gap between the performance of technical carboxymethyl cellulose (CMC) and purified polyanionic cellulose (PAC) materials. Moreover, there are no standard or agreed upon definitions of these two materials, which makes performance characteristics difficult to compare unless accompanied by complete characterization of the cellulose product. The functional properties of CMC and PAC depend on the degree of substitution (DS) the cellulose structure achieved during its synthesis. For example, the somewhat arbitrary definitions of CMC versus PAC is shown by the degree of substitution (DS) of CMC assigned values ranging from 0.6 to 0.95, and the DS of PAC has been assigned values ranging from 0.95 to 3.00. Another somewhat arbitrary definition of CMC assigns a DS of 0.70 to 0.90, and the DS of PAC from 0.90 to 3.00.

One goal in developing new cellulose products for use as drilling fluids, completion fluids, work-over fluids, or stimulation/fracking fluids is to improve the performance of technical grade materials, such that they provide shale inhibiting, thermostabilizing, viscosifying, and/or fluid loss reducing performance closer to that obtained using purified materials. Desirably, new cellulose products may also allow a reduction in the amount of costly potassium chloride required in the fluid system.

While not intending to be bound by theory, it is thought that this novel composition is particularly useful because it can provide shale inhibiting, thermostabilizing, viscosifying, fluid loss reducing effects, or combinations thereof when used as drilling fluids, completion fluids, work-over fluids, or stimulation/fracking fluids. As demonstrated by the data in the Examples, the shale inhibiting properties of the present cellulose products are improved over conventional compositions, including compositions that include cellulosic ethers modified with nitrilo-tri-acetic acid (NTA). "Shale" is a general term that refers to fine-grained sedimentary rock formed from consolidation of clay minerals with clay- and silt-sized particles into relatively impermeable layers. Shales can include the various primary clay mineral, such as the smectite clays (for example, montmorillonites), the kaolin clays (for example, kaolinites and halloysites), hydrous micas (for example, illites), chlorites, the palygorskite clays (for example, attapulgites and sepiolites), and combinations. Each of these clay minerals may be altered when in contact water. For example, the smectites are notorious for their considerable swelling and expansion when contacted with water, due to water penetrating the interlayer spaces of the clay. Shale reactions are described in detail in: Van Olphen, H., "An Introduction to Clay Colloid Chemistry", second edition, John Wiley & Sons, New York, 1977, p. 30; and Darley, H. C. H. and Gray, George R., "Compositions and Properties of Drilling and Completion Fluids", 5th edition, Gulf Publishing Company, Houston, p. 140. Therefore, enhancing shale-inhibiting properties while using non-carcinogenic compounds represents a significant improvement over conventional compositions.

As the drilling process has reached its target depth, the well has to be prepared for its function as oil- or gas producer, water- or gas- or cutting-injector or as water well or coal bed methane well. This phase is referred to as completion phase. Very often the drilling fluid will be exchanged for a so-called completion fluid to bring the well to completion in preparation for its function as a producing well. Completion fluids typically can be formulations that contain water, salts and various shale-inhibiting ingredients. In the completion stage of well drilling, the well will be provided with the necessary equipment to facilitate the final production. Because clays are possible or even likely in the "payzone" (hydrocarbon carrying layers), desirable completion fluids protect the shale and clays from swelling during the completion phase. For these completion operations to be successful, the payzone formation cannot be plugged with solids or swollen clays, which could hamper the equipment manipulation and the flow of liquids and/or gas. This phenomenon is called "impairment" and polymers such as those of this disclosure, can be added to restrict the flow of filtrate fluids into the formation. Therefore, both inhibition and fluid loss will be addressed by fluids containing the present cellulose products, as described.

In a further aspect, when a well has been operating and producing for an extended period of time, it may be desirable or necessary to overhaul the well and stimulate the production to higher levels. The fluids that are designed for such purposes are called work-over fluids. When work-over is needed, production will be shut down by injection of an adequate density, formulated liquid volume, in order to balance the pressure and flow. When needed, the well can be re-drilled to go deeper, or the down hole diameter of the well can be enlarged if desired. During all these manipulations, clays are often present and need to be protected from contact with fluids that will induce swelling. The disclosed compositions can provide the inhibition and fluid loss properties to achieve these goals.

When horizontal or deviate wells are drilled in shale formations that contain gas or oil, fracturing of the payzone (shale formations) may also be needed. For example, well section fractures will be induced by means of injecting liquid and/or gas under high pressure, a process that opens up the formation and creates more porosity and permeability for extracting the oil or gas. For the same reasons as discussed, any shales that are encountered will need to be protected by fluid ingredients with inhibiting and filtrate reducing properties. The disclosed compositions can provide the inhibition and filtrate reducing properties to achieve these goals. In a later phase of the operations, the polymer fraction of the fluid can be removed in various ways, for example, by enzymes, peroxides and/or persulfates, possibly in combination with acids, in order to clean the crevices that have been created.

Thus, when the present compositions are used to prepare or are used as a component in drilling fluids, completion fluids, work-over fluids, or stimulation/fracking fluids of the various types, these materials can and will inhibit reactive clays when drilling through geological structures. In this manner it is possible to avoid the loss of expensive drilling time and capital. While not theory bound, it is possible that the cellulose product can interact with the other ingredients present in the various fluid types to form further beneficial properties as a desired effect. Further, the drilling fluid encounters increasing temperatures as the well penetrates deeper into the earth's crust, and the rate of increase depends on the temperature gradient of the particular geological position of the formation being drilled. In horizontal drilling practices, drilling fluids must endure prolonged elevated temperature exposures. Therefore, the thermostabilty of the drilling and completion fluids must be high, and the compositions of this disclosure provide this thermal stability and protection against deterioration caused by the elevated temperature of the formation.

The publications and patents mentioned in this disclosure are incorporated herein by reference in their pertinent parts, for the purpose of describing the constructs and methodologies which might be used in connection with this disclosure. To the extent that any definition or usage provided by any document incorporated herein by reference conflicts with the definition or usage provided herein, the definition or usage provided herein controls.

Unless indicated otherwise, when a range of any type is disclosed or claimed, for example a temperature range, weight ratios, time of reaction, and the like, it is intended to disclose or claim individually each possible number that such a range could reasonably encompass, including any sub-ranges encompassed therein. For example, when describing a temperature range of from 90° C. to 100° C., each individual integral number within this range and its end points, or each number having one additional significant digit than the end points and the end points themselves, are encompassed therein. Therefore, in this example, when disclosing a range such as from 90° C. to 100° C., Applicants' intent is to recite that the temperature can be 90° C., 91° C., 92° C., 93° C., 94° C., 95° C., 96° C., 97° C., 98° C., 99° C., or 100° C., and these methods of describing such a range are interchangeable. Applicants also intend for the disclosure of such a range to reflect, and be equivalent to, disclosing any and all sub-ranges and combinations of sub-ranges encompassed therein. Accordingly, Applicants reserve the right to proviso out or exclude any individual members of such a group, any sub-ranges, or any combinations of sub-ranges within the group, if for any reason Applicants choose to claim less than the full measure of the disclosure.

In any application before the United States Patent and Trademark Office, the Abstract of this application is provided for the purpose of satisfying the requirements of 37 C.F.R. §1.72 and the purpose stated in 37 C.F.R. §1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Any headings are also not intended to be used to construe the scope of the claims or to limit the scope of the subject matter disclosed herein. Any use of the past tense to describe an example otherwise indicated as constructive or prophetic is not intended to reflect that the constructive or prophetic example has actually been carried out.

For any particular ligand or other compound disclosed, the general name, formula, or structure presented is intended to encompasses all conformational isomers and stereoisomers that may arise from a particular set of substituents, unless indicated otherwise. Thus, the general structure encompasses all enantiomers, diastereomers, and other optical isomers whether in enantiomeric or racemic forms, as well as mixtures of stereoisomers, as the context permits or requires. Accordingly, Applicants also reserve the right to proviso out or exclude any individual isomer of any such group, should they elect to claim less than the full measure of the disclosure.

The present disclosure is further illustrated by the following examples, which are not to be construed in any way as imposing limitations upon the scope of the disclosure.

EXAMPLES

General Details. In the syntheses described in the Examples, the resulting polymer products can be cleaned of their reaction by-products to obtain the purified polymer. For example, the sodium chloride and the glycolates from the carboxy-methylating portion of the reaction can be washed away if so desired. However, it is also possible to use the non-purified "technical" or so-called "tech" materials if desired. In some cases it can be beneficial to maintain the reaction ingredients except the liquid elements.

Synthesis and Characterization of Technical and Purified Grade Cellulose Products The following examples set out the general synthetic procedures for both technical and purified grade cellulose products according to this disclosure. The exemplified procedures can be adapted to the preparation and purification, if desired, of any of the cellulose products disclosed herein. Table 1 summarizes some characterization parameters for the various cellulose products prepared according to the respective Examples.

Example 1

Comparative Aluminum Sulfate-Trisodium Nitrilo-Tri Acetic Acid (NTA) Modified CMC, Technical (T) and Purified (P) Grades A sample of a cellulose product having a moisture content of less than 10 wt % was prepared using tri-sodium nitrilo-tri acetic acid (NTA), for comparative studies. 5342 Grams of wood pulp (wood pulp "A", moisture 6.4 wt %) and 11300 g of ethanol (92.7 wt %), were mixed together in a horizontal mixer having a heating jacket and nitrogen atmosphere as an option. 9146 Grams of sodium hydroxide (48.8 wt % active solution in water) was added, and the cellulose was mercerized for 25 minutes at 45° C. After this time, 6278 g of monochloracetic acid (79.8 wt % active solution in water) was added, and the temperature of this mixture was raised to 75° C. After this mixture was maintained at 75° C. for 20 minutes, 560 g of aluminum sulfate solution (27 wt % active) and 280 g of tri-sodium nitrilo-tri acetic acid solution (NTA, 40 wt % active, for example, Trilon® A, BASF) were added to the mixture. Ethanol was evaporated from the mixture utilizing heating and under pressure during a 90 minute time period. After ethanol evaporation, the mixture was kept at 60° C. for an additional 60 minutes. The technical product (Sample 1 T) was dried without purification at 80° C. to a moisture content of less than 10 wt %. Therefore, by-product NaCl and Na-glycolate were not washed out of the product in the technical samples.

For the purified product (Sample 1P), the product was mixed with 75 wt % EtOH and neutralized with hydrochloric acid. The product was washed four times using 75 wt % ethanol and once with 90 wt % ethanol. After the neutralization step and between each washing step, the filtrate was separated from the product by filtration. After the washings, the ethanol was recovered, and the purified product was dried at 80° C. to a moisture content of less than 10 wt %.

Example 2

Aluminum Sulfate-Citric Acid Modified CMC

Technical (T) and Purified (P) grades of aluminum sulfate-citric acid modified CMC were prepared according to the general procedure of Example 1, except that the tri-sodium nitrilo-tri acetic acid solution was replaced with 209 g of citric acid solution (40 wt % active solution in water).

Example 3

Aluminum Sulfate-Malic Acid Modified CMC

Technical (T) and Purified (P) grades of aluminum sulfate-malic acid modified CMC were prepared according to the general procedure of Example 1, except that the tri-sodium nitrilo-tri acetic acid solution was replaced with 292 g of malic acid solution (30 wt % active solution in water).

Example 4

Aluminum Sulfate-Maleic Acid Modified CMC

Technical (T) and Purified (P) grades of aluminum sulfate-maleic acid modified CMC were prepared according to the general procedure of Example 1, except that the tri-sodium nitrilo-tri acetic acid solution was replaced with 252 g of maleic acid solution (30 wt % active solution in water).

Example 5

Comparative Calcium Chloride-NTA Modified CMC

Technical (T) and Purified (P) grades of comparative samples of calcium chloride-NTA modified CMC were prepared according to the general procedure of Example 1, except that the aluminum sulfate solution was replaced with 433 g of $CaCl_2$ solution (121 g of $CaCl_2.2H_2O$ diluted with 312 g of water).

Example 6

Calcium Chloride-Citric Acid Modified CMC

Technical (T) and Purified (P) grades of calcium chloride-citric acid modified CMC were prepared as in Example 1, except that the aluminum sulfate solution was replaced with 433 g of $CaCl_2$ solution (121 g of $CaCl_2 \cdot 2H_2O$ diluted with 312 g of water).

Example 7

Calcium Chloride-Malic Acid Modified CMC

Technical (T) and Purified (P) grades of calcium chloride-malic acid modified CMC were prepared as in Example 3, except that the aluminum sulfate solution was replaced with 433 g of $CaCl_2$ solution (121 g of $CaCl_2 \cdot 2H_2O$ diluted with 312 g of water).

Example 8

Calcium Chloride-Maleic Acid Modified CMC

Technical (T) and Purified (P) grades of calcium chloride-maleic acid modified CMC were prepared as in Example 4, except that the aluminum sulfate solution was replaced with 433 g of $CaCl_2$ solution (121 g of $CaCl_2 \cdot 2H_2O$ diluted with 312 g of water).

Table 1 summarizes some cellulose product properties for the Example 1-8 samples in both technical (T) and purified (P) forms. The various polymer parameters are described in detail in the Table footnotes.

TABLE 1

Summary of Cellulose Product Properties[A]

| Example | Chemicals | % H$_2$O | Viscosity (2%) | DS | % NaCMC | % NaCl | pH |
|---|---|---|---|---|---|---|---|
| 1T | Al$_2$(SO$_4$)$_3$ + Trilon ® A | 6.7 | 370 | 1.04 | 59.9 | 23.00 | 10.70 |
| 2T | Al$_2$(SO$_4$)$_3$ + citric acid | 6.9 | 388 | 1.08 | 62.10 | 22.90 | 10.00 |
| 3T | Al$_2$(SO$_4$)$_3$ + malic acid | 5.6 | 375 | 1.03 | 60.00 | 23.10 | 8.90 |
| 4T | Al$_2$(SO$_4$)$_3$ + maleic acid | 7.6 | 338 | 1.04 | 61.50 | 22.90 | 9.90 |
| 5T | CaCl$_2$ + Trilon A | 7.3 | 285 | 1.12 | 60.90 | 24.20 | 11.30 |
| 6T | CaCl$_2$ + citric and | 6.7 | 230 | 1.11 | 60.20 | 24.40 | 11.10 |
| 7T | CaCl$_2$ + malic acid | 6.5 | 200 | 1.10 | 60.70 | 24.70 | 11.10 |
| 8T | CaCl$_2$ + maleic acid | 8.2 | 280 | 1.25 | 61.30 | 24.40 | 11.00 |
| 1P | Al$_2$(SO$_4$)$_3$ + Trilon ® A | 3.2 | 1840 | 1.10 | 97.60 | 1.60 | 7.50 |
| 2P | Al$_2$(SO$_4$)$_3$ + citric acid | 4.6 | 1800 | 1.06 | 98.80 | 0.80 | 6.60 |
| 3P | Al$_2$(SO$_4$)$_3$ + malic acid | 4.1 | 3500 | 1.07 | 98.80 | 0.80 | 6.50 |
| 4P | Al$_2$(SO$_4$)$_3$ + maleic acid | 4.8 | 3340 | 1.08 | 98.35 | 1.10 | 6.80 |
| 5P | CaCl$_2$ + Trilon A | 3.9 | 1270 | 1.20 | 97.30 | 1.80 | 8.10 |
| 6P | CaCl$_2$ + citric acid | 4.2 | 1440 | 1.19 | 98.70 | 0.90 | 6.90 |
| 7P | CaCl$_2$ + malic acid | 3.6 | 880 | 1.18 | 96.70 | 2.20 | 7.10 |
| 8P | CaCl$_2$ + maleic acid | 4.7 | 1480 | 1.21 | 98.58 | 0.95 | 7.00 |

[A]Abbreviations for Table 1
Example, "T" samples are unpurified technical samples, and "P" samples are purified as described in the respective Example.
% H$_2$O, moisture content in wt %.
Viscosity (2%), Brookfield viscosity of a 2 wt % solution in distilled water at 25° C., mPa · s.
DS, degree of substitution of the CMC.
% NaCMC, wt % of sodium carboxymethyl cellulose equivalent.
% NaCl, wt % of NaCl.
pH, pH of a 1% solution in distilled water.

Test Procedure and Performance Results

The performance of the modified CMC samples prepared according to this disclosure was tested using a shale inhibiting test called the hot rolling test, which measures the dispersability of shale chips.

Generally, a drilling fluid or "mud" compositions according to this disclosure was prepared using water, either a 1, 2, 4, OR 8 ppb concentration of the compositions according to the Examples, and NaOH to adjust the pH to 8. The abbreviation "ppb" refers to a unit of concentration of pounds-per-barrel, where a barrel is 42 U.S. gallons [0.16 m$^3$] (1 oilfield barrel). The preparations of this disclosure were made using the standard "barrel equivalent" volume of 350 cm$^3$ (used as 350 mL of distilled water in this disclosure) to represent 42 U.S. gallons, so that 1.0 gram mass added to make 350 mL of test fluid represents 1.0 ppb concentration. Therefore, preparing a 1 ppb, 2 ppb and 4 ppb mud formulation for testing purposes, is carried out by adding 1.0, 2.0, 4.0, and 8.0 gram of modified CMC, respectively, to 350 cm$^3$ of resulting fluid. The conversion factor is also 1 ppb equals 2.85 kg per m$^3$ or 2.85 g/L. The technical samples of the mud formulation were prepared and tested at 2 ppb and 4 ppb, and the purified samples of the mud formulation were prepared and tested at 1 ppb and 2 ppb, as recorded in the Tables.

The drilling fluid test samples were prepared using a common Hamilton Beach™ mixer as typically used in the drilling fluids industry for test purposes. The mixer container was charged with 350 mL of distilled water. The stirrer was then activated, and the polymer prepared according to the Examples was dosed according to the protocol for drilling fluid materials in ISO 13500, for CMC (carboxymethyl cellulose) and polyanionic cellulose (PAC) materials. When the liquid samples were ready after 20 minutes of mixing the drilling fluids were determined according to the procedure found in protocols API 13A or ISO 13500, for CMC, high viscosity (HV) and low viscosity (LV) tests.

To determine the shale inhibition capability of each sample, the "hot-rolling" dispersion test was applied, which resistance of a shale to disintegration and which allows an evaluation of cutting dispersion. The samples prepared as described were than transferred into a stainless steel hot rolling bomb, along with 100 g of crushed Pierre shale chips. The cylindrical stainless steel hot rolling bomb includes a bottom portion and a cap that incorporates a TEFLON® seal. The cap was secured tightly with the threaded screw-top lid, which includes three separate tightening screws to securely lock the lid. The cap includes a central gas port which facilitates pressuring the bomb or maintaining and/or venting any pressure that develops in the bomb if desired. See test protocol API 13 B-1/ISO 13501. After the bomb was sealed, it was placed in a hot rolling oven at 100° C. and "hot rolled" for 16 hours at approximately 40 rpm (revolutions per minute).

After the 16-hour test period, the bomb was allowed to cool to room temperature, and the contents were poured through a 1.18 mm sieve. The collected chips were washed of excess drilling fluid with water. The chips were then dried to a constant weight at 105° C., after which the chips were weighed to determine the loss of shale when in contact with the polymer solution under the test conditions.

The filtrate fluid that was passed through the sieve when recovering the chips was then further analyzed, and drilling fluid parameters such as plastic viscosity (PV) and filtrate loss were determined. Filtrate loss is the same as API fluid loss and was determined according to API RP13 B-1 or ISO 14014-1. Based on measured weight differences, before and after the hot rolling test, the performance of the new polymers was determined. These results are also provided in Table 2, in which the tri-sodium nitrilo-tri acetic acid (NTA)-modified CMC sample prepared according to Example 1, sample 1T, was used as a comparative sample and reference.

TABLE 2

Summary of the Application Results[A]

| Example | Chemicals | PV after 2 ppb | PV after 4 ppb | Filtrate loss 2 ppb | Filtrate loss 4 ppb | % Recovery 2 ppb | % Recovery 4 ppb |
|---|---|---|---|---|---|---|---|
| 1T | $Al_2(SO_4)_3$ + Trilon ® A | 4 | 9 | 18.9 | 16.3 | 93.81 | 92.88 |
| 2T | $Al_2(SO_4)_3$ + citric acid | 5 | 7 | 15.0 | 13.4 | 91.83 | 91.42 |
| 3T | $Al_2(SO_4)_3$ + malic acid | 8 | 14 | 17.2 | 16.2 | 94.51 | 95.21 |
| 4T | $Al_2(SO_4)_3$ + maleic acid | 6 | 7 | 15.1 | 13.4 | 95.36 | 96.30 |
| 5T | $CaCl_2$ + Trilon ® A | 3 | 8 | 20.0 | 16.2 | 91.13 | 95.26 |
| 6T | $CaCl_2$ + citric acid | 13 | 18 | 16.2 | 14.7 | 92.38 | 95.44 |
| 7T | $CaCl_2$ + malic acid | 12 | 22 | 16.2 | 14.7 | 92.38 | 96.24 |
| 8T | $CaCl_2$ + maleic acid | — | 10 | — | 14.2 | — | 97.83 |

| Example | Chemicals | PV after 1 ppb | PV after 2 ppb | Filtrate loss 1 ppb | Filtrate loss 2 ppb | % Recovery 1 ppb | % Recovery 2 ppb |
|---|---|---|---|---|---|---|---|
| 1P | $Al_2(SO_4)_3$ + Trilon ® A | 9 | 16 | 20.1 | 21.4 | 93.28 | 91.65 |
| 2P | $Al_2(SO_4)_3$ + citric acid | 11 | 10 | 14.1 | 11.5 | 90.53 | 91.70 |
| 3P | $Al_2(SO_4)_3$ + malic acid | 14 | 14 | 16.5 | 17.3 | 90.21 | 95.65 |
| 4P | $Al_2(SO_4)_3$ + maleic acid | 4 | 9 | 17.8 | 11.8 | 95.04 | 93.47 |
| 5P | $CaCl_2$ + Trilon ® A | 4 | 9 | 21.5 | 13.1 | 93.68 | 92.98 |
| 6P | $CaCl_2$ + citric acid | 11 | 21 | 17.4 | 11.7 | 97.33 | 97.54 |
| 7P | $CaCl_2$ + malic acid | 10 | 21 | 15.3 | 12.8 | 96.64 | 98.74 |
| 8P | $CaCl_2$ + maleic acid | — | 21 | — | 11.9 | — | 97.97 |

[A]Abbreviations for Table 2
PV, Plastic Viscosity in centiPoise
Filtrate loss, API fluid loss reduction, in mL/30 minutes, according to API Fluid Loss Test, API RP13 B-1 or ISO 14014-1.
% Recovery, wt % shale chips recovered after hot rolling test and collection by 1.18 mm sieve The Table 2 data show improved performance of the newly modified grades. For example, significantly lower API fluid loss (filtrate loss) for the citric-, malic-, and maleic-acid modified CMC as compared the NTA-modified CMC was demonstrated, as well as significantly higher plastic viscosity (PV) for the new materials. Plastic Viscosity (PV) represents the viscosity of a mud when extrapolated to infinite shear rate on the basis of the mathematics of the Bingham model. Thus, PV is the slope of the shear stress/shear rate line above the yield point. In addition, the Table 2 data also show improved performance with respect to the percent recovery (wt %) of the shale chips after the hot rolling test, demonstrated the lower propensity of these modified cellulosic materials to disperse the shale.

Properties and Performance Results of Technical and Purified Grade Cellulose Products in Target Viscosity Ranges The properties of the cellulose products of this disclosure can be adjusted for viscosity and degree of substitution (DS), as well as other parameters, to tailor the cellulose product for a particular utility. A series of cellulose products were prepared according to a target viscosity that would be applicable to specific uses, and comparative examples using NTA modified CMC with both aluminum and calcium salts were prepared and examined. Synthesis, characterization, and performance tests used for the cellulose products of Examples 9-32 were analogous to those used for the Examples 1-8 products. Target polymer viscosities and their designations are illustrated in Table 3, and the data tables characterizing the cellulose products and their performance characteristics are listed.

TABLE 3

Product Designation by Target Viscosity and Degree of Substitution

| Product Designation | 2 wt % Brookfield Viscosity at 25° C. (mPa · s) | Degree of Substitution (DS) | Data Tables |
|---|---|---|---|
| High Viscosity | 3,000-10,000 | >0.9 | 4-6 |
| Standard Viscosity | 500-1,000 | >0.9 | 7-0 |
| Ultra Low Viscosity | 0.2-20 | >0.9 | 10-12 |

Both technical and purified grade products are prepared and compared. For the characterization data for the cellulose product of Tables 4, 7, and 10, the viscosities were measured at the indicated concentrations, which depended on the technical grade and the target viscosity, as noted. The column labeled "DS" is the degree of substitution of the CMC, as disclosed herein. The column labeled "NaCMC" is the weight percent sodium carboxymethyl cellulose equivalent in the dry product.

For the performance data presented in Tables 5-6, 8-9, and 11-12, performance is reported in terms of percent recovery and API Fluid loss for inhibition of Pierre shale, when subjected to the "hot-rolling" dispersion test. The "Recovery" is the wt % shale chips recovered after hot rolling test and collection by 1.18 mm sieve, at the indicated test dosage. The test dosage varied according to viscosity and grade and generally ranged from 1 ppb to 8 ppb, as indicated. The "API Fluid Loss" refers to the filtrate reduction, in mL/30 minutes, according to API Fluid Loss Test, API RP13 B-1 or ISO 14014-1, at the indicated test dosage of 1 ppb or 2 ppb.

Examples 9-16

The Example 9-16 cellulose products are high viscosity products, having target 2 wt % Brookfield viscosity (at 25°

C.) of 3,000-10,000 mPa·s, and a target degree of substitution of >0.9. For Examples 9-16, the comparative examples using NTA modified CMC with aluminum and calcium salts are reported in Examples 9 and 13, respectively.

TABLE 4

High Viscosity Cellulose Product Properties

| Product Type | Example No. | Product | Viscosity [A] | DS [B] | NaCMC [C] |
|---|---|---|---|---|---|
| High Viscosity Technical | 9T | Al-NTA-CMC | 4300 (2%) | 1.05 | 61.4 |
| | 10T | Al-Citric-CMC | 4500 | 0.97 | 60.6 |
| | 11T | Al-Malic-CMC | 5800 | 1.00 | 63.0 |
| | 12T | Al-Maleic-CMC | 6300 | 0.98 | 60.2 |
| | 13T | Ca-NTA-CMC | 2650 | 1.08 | 62.6 |
| | 14T | Ca-Citric-CMC | 3250 | 1.03 | 61.8 |
| | 15T | Ca-Malic-CMC | 4420 | 1.14 | 62.9 |
| | 16T | Ca-Maleic-CMC | 3050 | 1.04 | 60.3 |
| High Viscosity Purified | 9P | Al-NTA-CMC | 1880 (1%) | 1.19 | 99.7 |
| | 10P | Al-Citric-CMC | 3920 | 0.99 | 99.6 |
| | 11P | Al-Malic-CMC | 1940 | 1.04 | 99.3 |
| | 12P | Al-Maleic-CMC | 2500 | 1.07 | 98.7 |
| | 13P | Ca-NTA-CMC | 1140 | 1.22 | 99.5 |
| | 14P | Ca-Citric-CMC | 1380 | 1.15 | 98.5 |
| | 15P | Ca-Malic-CMC | 1620 | 1.17 | 99.0 |
| | 16P | Ca-Maleic-CMC | 1480 | 1.14 | 99.0 |

[A] Technical grade viscosities measured at 2 wt %; purified grade viscosities measured at 1 wt % (2 wt % viscosities for purified product will be 10-fold higher).
[B] DS, degree of substitution of the CMC
[C] Weight percent sodium carboxymethyl cellulose equivalent in the dry product.

TABLE 5

High Viscosity Technical Grade Cellulose Product Performance

| | | Recovery | | API Fluid Loss | |
|---|---|---|---|---|---|
| Example | Product | 1 ppb | 2 ppb | 1 ppb | 2 ppb |
| 9T | Al-NTA-CMC | 91.8 | 89.7 | 18.7 | 16.5 |
| 10T | Al-Citric-CMC | 92.5 | 93.8 | 17.2 | 14.0 |
| 11T | Al-Malic-CMC | 92.9 | 92.5 | 16.7 | 15.4 |
| 12T | Al-Maleic-CMC | 92.4 | 92.6 | 17.3 | 13.2 |
| 13T | Ca-NTA-CMC | 91.6 | 90.3 | 14.6 | 12.5 |
| 14T | Ca-Citric-CMC | 93.3 | 92.0 | 12.8 | 12.4 |
| 15T | Ca-Malic-CMC | 92.5 | 93.1 | 12.4 | 11.5 |
| 16T | Ca-Maleic-CMC | 92.9 | 92.0 | 12.9 | 12.0 |

[A] Abbreviations:
Recovery is the wt % shale chips recovered after hot rolling test (16 hours at 100° C.) and collection by 1.18 mm sieve, at the indicated test dosage of 1 ppb or 2 ppb.
API fluid loss is the filtrate reduction, in mL/30 minutes, according to API Fluid Loss Test, API RP13 B-1 or ISO 14014-1, at the indicated test dosage of 1 ppb or 2 ppb.

TABLE 6

High Viscosity Purified Grade Cellulose Product Performance [A]

| | | Recovery | | API Fluid Loss | |
|---|---|---|---|---|---|
| Example | Product | 1 ppb | 2 ppb | 1 ppb | 2 ppb |
| 9P | Al-NTA-CMC | 90.3 | 88.9 | 18.0 | 11.2 |
| 10P | Al-Citric-CMC | 92.8 | 89.4 | 17.6 | 12.4 |
| 11P | Al-Malic-CMC | 92.5 | 89.8 | 22.6 | 12.4 |
| 12P | Al-Maleic-CMC | 91.4 | 90.8 | 14.3 | 14.2 |
| 13P | Ca-NTA-CMC | 89.6 | 89.0 | 20.1 | 12.8 |
| 14P | Ca-Citric-CMC | 95.2 | 98.2 | 15.9 | 12.6 |
| 15P | Ca-Malic-CMC | 90.8 | 92.1 | 16.2 | 13.6 |
| 16P | Ca-Maleic-CMC | 94.2 | 95.1 | 16.8 | 13.5 |

[A] Abbreviations:
Recovery is the wt % shale chips recovered after hot rolling test (16 hours at 100° C.) and collection by 1.18 mm sieve, at the indicated test dosage of 1 ppb or 2 ppb.
API fluid loss is the filtrate reduction, in mL/30 minutes, according to API Fluid Loss Test, API RP13 B-1 or ISO 14014-1, at the indicated test dosage of 1 ppb or 2 ppb.

Examples 17-24

The Example 17-24 cellulose products are regular or standard viscosity products, having target 2 wt % Brookfield viscosity (at 25° C.) of 500-1,000 mPa·s, and a target degree of substitution of >0.9. For Examples 17-24, the comparative examples using NTA modified CMC with aluminum and calcium salts are reported in Examples 17 and 21, respectively.

TABLE 7

Standard Viscosity Cellulose Product Properties

| Product Type | Example No. | Product | Viscosity [A] | DS [B] | NaCMC [C] |
|---|---|---|---|---|---|
| Standard Viscosity Technical | 17T | Al-NTA-CMC | 370 | 1.04 | 59.9 |
| | 18T | Al-Citric-CMC | 388 | 1.08 | 62.1 |
| | 19T | Al-Malic-CMC | 375 | 1.03 | 60.0 |
| | 20T | Al-Maleic-CMC | 338 | 1.04 | 61.5 |
| | 21T | Ca-NTA-CMC | 285 | 1.12 | 60.9 |
| | 22T | Ca-Citric-CMC | 230 | 1.11 | 60.2 |
| | 23T | Ca-Malic-CMC | 200 | 1.10 | 60.7 |
| | 24T | Ca-Maleic-CMC | 280 | 1.25 | 61.3 |
| Standard Viscosity Purified | 17P | Al-NTA-CMC | 1840 | 1.10 | 97.6 |
| | 18P | Al-Citric-CMC | 1800 | 1.06 | 98.8 |
| | 19P | Al-Malic-CMC | 3500 | 1.07 | 98.8 |
| | 20P | Al-Maleic-CMC | 3340 | 1.08 | 98.4 |
| | 21P | Ca-NTA-CMC | 1270 | 1.20 | 97.3 |
| | 22P | Ca-Citric-CMC | 1440 | 1.19 | 98.7 |
| | 23P | Ca-Malic-CMC | 1880 | 1.18 | 96.7 |
| | 24P | Ca-Maleic-CMC | 1480 | 1.21 | 98.6 |

[A] Viscosities measured at 2 wt %.
[B] DS, degree of substitution of the CMC
[C] Weight percent sodium carboxymethyl cellulose equivalent.

TABLE 8

Standard Viscosity Technical Grade Cellulose Product Performance

| | | Recovery | | API Fluid Loss | |
|---|---|---|---|---|---|
| Example | Product | 2 ppb | 4 ppb | 2 ppb | 4 ppb |
| 17T | Al-NTA-CMC | 90.7 | 89.5 | 18.9 | 12.3 |
| 18T | Al-Citric-CMC | 94.0 | 95.3 | 15.0 | 13.4 |
| 19T | Al-Malic-CMC | 91.4 | 94.0 | 18.2 | 16.5 |
| 20T | Al-Maleic-CMC | 93.6 | 94.2 | 17.4 | 16.2 |
| 21T | Ca-NTA-CMC | 87.1 | 88.2 | 22.5 | 13.5 |
| 22T | Ca-Citric-CMC | 95.5 | 97.1 | 16.6 | 12.2 |
| 23T | Ca-Malic-CMC | 95.3 | 96.5 | 17.6 | 12.4 |
| 24T | Ca-Maleic-CMC | 95.2 | 96.8 | 17.8 | 12.7 |

[A] Abbreviations:
Recovery is the wt % shale chips recovered after hot rolling test (16 hours at 100° C.) and collection by 1.18 mm sieve, at the indicated test dosage of 2 ppb or 4 ppb.
API fluid loss is the filtrate reduction, in mL/30 minutes, according to API Fluid Loss Test, API RP13 B-1 or ISO 14014-1, at the indicated test dosage of 1 ppb or 2 ppb.

TABLE 9

Standard Viscosity Purified Grade Cellulose Product Performance [A]

| | | Recovery | | API Fluid Loss | |
|---|---|---|---|---|---|
| Example | Product | 1 ppb | 2 ppb | 1 ppb | 2 ppb |
| 17P | Al-NTA-CMC | 90.1 | 88.6 | 20.0 | 11.7 |
| 18P | Al-Citric-CMC | 93.5 | 97.3 | 11.0 | 10.5 |
| 19P | Al-Malic-CMC | 92.3 | 92.8 | 17.3 | 11.6 |
| 20P | Al-Maleic-CMC | 92.4 | 93.0 | 16.8 | 10.8 |
| 21P | Ca-NTA-CMC | 87.4 | 89.8 | 21.5 | 16.5 |
| 22P | Ca-Citric-CMC | 94.9 | 96.8 | 17.2 | 13.1 |

TABLE 9-continued

Standard Viscosity Purified Grade Cellulose Product Performance [A]

| | | Recovery | | API Fluid Loss | |
|---|---|---|---|---|---|
| Example | Product | 1 ppb | 2 ppb | 1 ppb | 2 ppb |
| 23P | Ca-Malic-CMC | 93.2 | 94.5 | 18.8 | 14.8 |
| 24P | Ca-Maleic-CMC | 92.6 | 95.8 | 17.3 | 13.7 |

[A] Abbreviations:
Recovery is the wt % shale chips recovered after hot rolling test (16 hours at 100° C.) and collection by 1.18 mm sieve, at the indicated test dosage of 1 ppb or 2 ppb.
API fluid loss is the filtrate reduction, in mL/30 minutes, according to API Fluid Loss Test, API RP13 B-1 or ISO 14014-1, at the indicated test dosage of 1 ppb or 2 ppb.

Examples 25-32

The Example 25-32 cellulose products are regular or standard viscosity products, having target 2 wt % Brookfield viscosity (at 25° C.) of 500-1,000 mPa·s, and a target degree of substitution of >0.9. For Examples 25-32, the comparative examples using NTA modified CMC with aluminum and calcium salts are reported in Examples 25 and 29, respectively.

TABLE 10

Ultra Low Viscosity Cellulose Product Properties

| Product Type | Example No. | Product | Viscosity [A] | DS [B] | NaCMC [C] |
|---|---|---|---|---|---|
| Ultra Low Viscosity Technical | 25T | Al-NTA-CMC | 82 | 1.00 | 58.7 |
| | 26T | Al-Citric-CMC | 85 | 1.08 | 59.7 |
| | 27T | Al-Malic-CMC | 130 | 0.81 | 58.5 |
| | 28T | Al-Maleic-CMC | 105 | 1.05 | 60.5 |
| | 29T | Ca-NTA-CMC | 71 | 1.20 | 61.5 |
| | 30T | Ca-Citric-CMC | 80 | 1.18 | 60.7 |
| | 31T | Ca-Malic-CMC | 140 | 0.93 | 59.8 |
| | 32T | Ca-Maleic-CMC | 58 | 1.12 | 61.9 |
| Ultra Low Viscosity Purified | 25P | Al-NTA-CMC | 520 | 0.98 | 99.9 |
| | 26P | Al-Citric-CMC | 465 | 0.98 | 99.9 |
| | 27P | Al-Malic-CMC | 1530 | 0.83 | 100.0 |
| | 28P | Al-Maleic-CMC | 890 | 0.99 | 99.9 |
| | 29P | Ca-NTA-CMC | 345 | 1.07 | 99.9 |
| | 30P | Ca-Citric-CMC | 465 | 1.11 | 100.0 |
| | 31P | Ca-Malic-CMC | 890 | 0.99 | 99.9 |
| | 32P | Ca-Maleic-CMC | 255 | 1.05 | 99.9 |

[A] Viscosities measured at 4 wt %.
[B] DS, degree of substitution of the CMC
[C] Weight percent sodium carboxymethyl cellulose equivalent.

TABLE 11

Ultra Low Viscosity Technical Grade Cellulose Product Performance

| | | Recovery | | API Fluid Loss | |
|---|---|---|---|---|---|
| Example | Product | 4 ppb | 8 ppb | 4 ppb | 8 ppb |
| 25T | Al-NTA-CMC | 90.1 | 92.4 | 18.3 | 8.8 |
| 26T | Al-Citric-CMC | 90.0 | 91.8 | 16.8 | 8.1 |
| 27T | Al-Malic-CMC | 92.2 | 92.3 | 18.8 | 14.4 |
| 28T | Al-Maleic-CMC | 89.9 | 92.6 | 16.2 | 8.4 |
| 29T | Ca-NTA-CMC | 92.1 | 94.1 | 19.4 | 10.2 |
| 30T | Ca-Citric-CMC | 95.5 | 98.4 | 14.3 | 8.0 |
| 31T | Ca-Malic-CMC | 94.2 | 98.1 | 15.6 | 12.5 |
| 32T | Ca-Maleic-CMC | 94.8 | 98.2 | 16.1 | 9.0 |

[A] Abbreviations:
Recovery is the wt % shale chips recovered after hot rolling test (16 hours at 100° C.) and collection by 1.18 mm sieve, at the indicated test dosage of 4 ppb or 8 ppb.
API fluid loss is the filtrate reduction, in mL/30 minutes, according to API Fluid Loss Test, API RP13 B-1 or ISO 14014-1, at the indicated test dosage of 1 ppb or 2 ppb.

TABLE 12

Ultra Low Viscosity Purified Grade Cellulose Product Performance [A]

| | | Recovery | | API Fluid Loss | |
|---|---|---|---|---|---|
| Example | Product | 2 ppb | 4 ppb | 2 ppb | 4 ppb |
| 25P | Al-NTA-CMC | 91.3 | 94.6 | 19.5 | 15 |
| 26P | Al-Citric-CMC | 95.8 | 95.7 | 15.1 | 8.2 |
| 27P | Al-Malic-CMC | 94.1 | 95.6 | 15.8 | 8.9 |
| 28P | Al-Maleic-CMC | 93.7 | 94.6 | 16.4 | 10.2 |
| 29P | Ca-NTA-CMC | 92.2 | 86.8 | 18.4 | 12.3 |
| 30P | Ca-Citric-CMC | 92.6 | 89.5 | 16.2 | 8.8 |
| 31P | Ca-Malic-CMC | 92.0 | 89.7 | 17.2 | 9.8 |
| 32P | Ca-Maleic-CMC | 90.8 | 92.3 | 15.2 | 14.9 |

[A] Abbreviations:
Recovery is the wt % shale chips recovered after hot rolling test (16 hours at 100° C.) and collection by 1.18 mm sieve, at the indicated test dosage of 2 ppb or 4 ppb.
API fluid loss is the filtrate reduction, in mL/30 minutes, according to API Fluid Loss Test, API RP13 B-1 or ISO 14014-1, at the indicated test dosage of 1 ppb or 2 ppb.

The laboratory tests illustrated by Example 9-32 and the data of Tables 4-12 show clear performance improvements in shale recoveries and fluid losses after hot rolling as compared to conventional products. Virtually every cellulose product prepared according to the present disclosure exhibits improved recovery and lower fluid loss than the comparative samples of NTA modified CMC with aluminum and calcium salts. Moreover, the technical grade cellulose products of this disclosure often outperformed the purified grade products of the comparative NTA modified CMC with aluminum and calcium samples. These improvements occurred in all three viscosity ranges. While not intending to be bound by theory, it is expected that reduction in the amounts of potassium chloride as a shale inhibition additive will be possible using the compositions and methods disclosed herein. It is significant that all the components used in the disclosed cellulose products have top rated environmental credentials and all are PLONOR listed, which should simplify national environmental certifications and approvals.

It is to be understood that the foregoing disclosure relates only to the preferred embodiments of the present application and that numerous changes and modifications may be made herein without departing from the general scope of the invention as defined by the following claims and the equivalents thereof.

What is claimed is:
1. A cellulose product comprising:
   a) at least one cellulosic ether selected from carboxymethyl cellulose (CMC), hydroxyethyl cellulose (HEC), carboxymethyl hydroxyethyl cellulose (CMHEC), methyl cellulose (MC), hydroxyethyl methyl cellulose (HEMC), ethyl hydroxyl ethyl cellulose (EHEC), hydroxypropyl cellulose (HPC), or combinations thereof;
   b) at least one salt that is a water soluble salt of beryllium (II), magnesium(II), calcium(II), strontium(II), barium (II), titanium(II), vanadium(II), vanadium(IV), vanadium(V), chromium(III), chromium(IV), manganese(II), manganese(III), iron(II), iron(III), cobalt(II), cobalt (III), nickel(II), zinc(II), aluminum(III), tin(II), tin (IV), or combinations thereof; and
   c) at least one ligand selected from at least one poly (carboxylic) acid or a salt thereof that comprises secondary nitrogen atoms, primary nitrogen atoms, or no nitrogen atoms, wherein the cellulose product has less than 10 wt % water.

2. A cellulose product according to claim 1, wherein the poly(carboxylic) acid or the salt thereof is selected from citric acid, malic acid, maleic acid, fumaric acid, oxaloacetic acid, aconitic acid, iso-citric acid, α-ketoglutaric acid, β-ketoglutaric acid, succinic acid, ascorbic acid, 2,2'-azanediyldisuccinic acid, tetrasodium iminodisuccinate, dicarboxymethyl glutamic acid, ethylenediamine-N,N'-disuccinic acid, oxalic acid, aspartic acid, glutaric acid, glutamic acid, salts thereof, or combinations thereof.

3. A cellulose product according to claim 1, wherein the at least one salt is a water soluble salt of calcium(II), iron(II), iron(III), zinc(II), nickel(II), tin(II), tin (IV), or combinations thereof.

4. A cellulose product according to claim 1, wherein the at least one salt is calcium chloride, and wherein the ligand is citric acid, malic acid, maleic acid, or combinations thereof.

5. A cellulose product according to claim 1, wherein:
the cellulosic ether is carboxymethyl cellulose (CMC);
the at least one salt is a water soluble salt of calcium(II), iron(II), iron(III), zinc(II), nickel(II), tin(II), or tin (IV); and
the ligand is a citric acid cycle substrate or product.

6. A cellulose product according to claim 1, wherein:
the cellulosic ether is carboxymethyl cellulose (CMC);
the at least one salt is a water soluble salt of calcium(II); and
the ligand is citric acid, malic acid, or maleic acid.

7. A cellulose product according to claim 1, wherein:
the cellulosic ether is carboxymethyl cellulose (CMC), the at least one salt is a water soluble salt of calcium (II); and the ligand is citric acid, malic acid, maleic acid, fumaric acid, oxaloacetic acid, aconitic acid, iso-citric acid, α-ketoglutaric acid, β-ketoglutaric acid, succinic acid, ascorbic acid, or combinations thereof;
the cellulose product is characterized by 2 wt % Brookfield viscosity at 25° C. of from 3,000 to 8,000 mPa·s;
the cellulose product is characterized by a weight percent recovery of shale chips on a 1.18 mm sieve after hot rolling for 16 hours at 100° C. at a 1 ppb test dosage of greater than 92%; and
the cellulose product is characterized by an API Fluid Loss according to ISO 14014-1 at a 1 ppb test dosage of less than 18 mL/30 minutes.

8. A cellulose product according to claim 1, wherein:
the cellulosic ether is carboxymethyl cellulose (CMC), the at least one salt is a water soluble salt of calcium (II); and the ligand is citric acid, malic acid, maleic acid, fumaric acid, oxaloacetic acid, aconitic acid, iso-citric acid, α-ketoglutaric acid, β-ketoglutaric acid, succinic acid, ascorbic acid, or combinations thereof;
the cellulose product is characterized by 1 wt % Brookfield viscosity at 25° C. of from 1,200 to 4,000 mPa·s;
the cellulose product is characterized by a weight percent recovery of shale chips on a 1.18 mm sieve after hot rolling for 16 hours at 100° C. at a 2 ppb test dosage of greater than 89%; and
the cellulose product is characterized by an API Fluid Loss according to ISO 14014-1 at a 2 ppb test dosage of less than 14 mL/30 minutes.

9. A cellulose product according to claim 1, wherein:
the cellulosic ether is carboxymethyl cellulose (CMC), the at least one salt is a water soluble salt of calcium (II); and the ligand is citric acid, malic acid, maleic acid, fumaric acid, oxaloacetic acid, aconitic acid, iso-citric acid, α-ketoglutaric acid, β-ketoglutaric acid, succinic acid, ascorbic acid, or combinations thereof;
the cellulose product is characterized by 2 wt % Brookfield viscosity at 25° C. of from 200 to 1,000 mPa·s;
the cellulose product is characterized by a weight percent recovery of shale chips on a 1.18 mm sieve after hot rolling for 16 hours at 100° C. at a 2 ppb test dosage of greater than 91%; and
the cellulose product is characterized by an API Fluid Loss according to ISO 14014-1 at a 2 ppb test dosage of less than 18.5 mL/30 minutes.

10. A cellulose product according to claim 1, wherein:
the cellulosic ether is carboxymethyl cellulose (CMC), the at least one salt is a water soluble salt of calcium (II); and the ligand is citric acid, malic acid, maleic acid, fumaric acid, oxaloacetic acid, aconitic acid, iso-citric acid, α-ketoglutaric acid, β-ketoglutaric acid, succinic acid, ascorbic acid, or combinations thereof;
the cellulose product is characterized by 2 wt % Brookfield viscosity at 25° C. of from 500 to 3,500 mPa·s;
the cellulose product is characterized by a weight percent recovery of shale chips on a 1.18 mm sieve after hot rolling for 16 hours at 100° C. at a 1 ppb test dosage of greater than 92%; and
the cellulose product is characterized by an API Fluid Loss according to ISO 14014-1 at a 1 ppb test dosage of less than 19 mL/30 minutes.

11. A cellulose product according to claim 1, wherein:
the cellulosic ether is carboxymethyl cellulose (CMC), the at least one salt is a water soluble salt of calcium (II); and the ligand is citric acid, malic acid, maleic acid, fumaric acid, oxaloacetic acid, aconitic acid, iso-citric acid, α-ketoglutaric acid, β-ketoglutaric acid, succinic acid, ascorbic acid, or combinations thereof;
the cellulose product is characterized by 4 wt % Brookfield viscosity at 25° C. of from 20 to 200 mPa·s;
the cellulose product is characterized by a weight percent recovery of shale chips on a 1.18 mm sieve after hot rolling for 16 hours at 100° C. at a 4 ppb test dosage of greater than 89.5%; and
the cellulose product is characterized by an API Fluid Loss according to ISO 14014-1 at a 4 ppb test dosage of less than 19 mL/30 minutes.

12. A cellulose product according to claim 1, wherein:
the cellulosic ether is carboxymethyl cellulose (CMC), the at least one salt is a water soluble salt of calcium (II); and the ligand is citric acid, malic acid, maleic acid, fumaric acid, oxaloacetic acid, aconitic acid, iso-citric acid, α-ketoglutaric acid, β-ketoglutaric acid, succinic acid, ascorbic acid, or combinations thereof;
the cellulose product is characterized by 4 wt % Brookfield viscosity at 25° C. of from 20 to 200 mPa·s;
the cellulose product is characterized by a weight percent recovery of shale chips on a 1.18 mm sieve after hot rolling for 16 hours at 100° C. at a 2 ppb test dosage of greater than 90%; and
the cellulose product is characterized by an API Fluid Loss according to ISO 14014-1 at a 2 ppb test dosage of less than 18 mL/30 minutes.

13. A method of using a cellulose product comprising:
a) providing a cellulose product according to claim 1;
b) combining the cellulose product with an aqueous carrier to form a water-based modified cellulose composition; and
c) using the water-based modified cellulose composition as a drilling fluid, a completion fluid, a work-over fluid, or a stimulation/fracking fluid.

14. A method of using a cellulose product according to claim 13, further comprising combining the water-based modified cellulose composition with a cross-linking agent, an inhibition agent, a viscosifying agent, a filtrate reducing agent, a thermal stabilizing agent, a shear strength stabilizing agent, a bentonite clay, an illite clay, a smectite clay, a montmorillonite clay, a kaolite clay, barium sulfate, calcium carbonate, hematite, a starch, a deflocculant, an anionic polyelectrolyte, an acrylate, a polyphosphate, a lignosulfonate, tannic acid, a derivatized tannic acid, an unmodified cellulosic material, a lubricant, a weighting agent, a fluid loss additive, a brine, a formate salt, or combinations thereof.

15. A cellulose product according to claim 1, wherein the salt of a polyvalent metal ion is aluminum sulfate or a combination of aluminum sulfate and calcium chloride, and wherein the ligand is citric acid, malic acid, maleic acid, or combinations thereof.

16. A cellulose product comprising:
a) carboxymethyl cellulose (CMC);
b) aluminum sulfate or calcium chloride; and
c) at least one ligand selected from citric acid, malic acid, or maleic acid;
wherein the cellulose product has less than 10 wt % water.

* * * * *